(12) United States Patent
Telefus et al.

(10) Patent No.: US 10,615,713 B2
(45) Date of Patent: Apr. 7, 2020

(54) HIGH EFFICIENCY AC TO DC CONVERTER AND METHODS

(71) Applicant: INTELESOL, LLC, Danville, CA (US)

(72) Inventors: Mark Telefus, Orinda, CA (US); Bradley Larson, Sunnyvale, CA (US)

(*) Notice: Subject to any disclaimer, the term of this patent is extended or adjusted under 35 U.S.C. 154(b) by 2 days.

(21) Appl. No.: 16/092,263

(22) PCT Filed: May 1, 2017

(86) PCT No.: PCT/US2017/030411
§ 371 (c)(1),
(2) Date: Oct. 9, 2018

(87) PCT Pub. No.: WO2017/196571
PCT Pub. Date: Nov. 16, 2017

(65) Prior Publication Data
US 2019/0165691 A1    May 30, 2019

Related U.S. Application Data

(60) Provisional application No. 62/414,467, filed on Oct. 28, 2016, provisional application No. 62/333,193, filed on May 7, 2016.

(51) Int. Cl.
| H02M 7/219 | (2006.01) |
| H02M 3/06 | (2006.01) |
| H02M 7/155 | (2006.01) |
| H02M 7/162 | (2006.01) |
| H02M 7/06 | (2006.01) |
| H02M 1/15 | (2006.01) |
| H02M 1/00 | (2006.01) |

(52) U.S. Cl.
CPC ............ *H02M 7/219* (2013.01); *H02M 1/15* (2013.01); *H02M 3/06* (2013.01); *H02M 7/06* (2013.01); *H02M 7/155* (2013.01); *H02M 7/162* (2013.01); *H02M 2001/0048* (2013.01); *Y02B 70/1491* (2013.01)

(58) Field of Classification Search
CPC .......... H02M 7/06; H02M 7/219; H02M 3/06
See application file for complete search history.

(56) References Cited

U.S. PATENT DOCUMENTS

| 3,638,102 | A | * | 1/1972 | Pelka | ................ | H02H 3/08 |
| | | | | | | 361/58 |
| 3,777,253 | A | * | 12/1973 | Callan | ................ | G05F 3/18 |
| | | | | | | 323/284 |
| 4,074,345 | A | | 2/1978 | Ackermann | | |
| 4,127,895 | A | | 11/1978 | Krueger | | |

(Continued)

OTHER PUBLICATIONS

Eguchi et al, Design of a Charge-Pump Type AC-DC Converter for RF-ID Tags, 2006 International Symposium on Communications and Information Technologies, F4D-3, IEEE (2006).

(Continued)

*Primary Examiner* — Gary L Laxton
(74) *Attorney, Agent, or Firm* — Mark Wisnosky

(57) ABSTRACT

An improved AC to DC conversion system consists of an electronic switch employed to disconnect the input of a prior art series voltage regulator circuit from a rectified AC mains power supply over a fraction of the period of the AC mains to reduce the power dissipated within the series regulator.

41 Claims, 11 Drawing Sheets

(56) References Cited

U.S. PATENT DOCUMENTS

| | | | |
|---|---|---|---|
| 4,685,046 A * | 8/1987 | Sanders | H02M 7/2176 323/299 |
| 4,760,293 A | 7/1988 | Hebenstreit | |
| 5,307,257 A * | 4/1994 | Fukushima | H02M 7/2176 323/300 |
| 5,410,745 A * | 4/1995 | Friesen | H04B 1/24 348/707 |
| 5,646,514 A * | 7/1997 | Tsunetsugu | H02M 7/2176 323/288 |
| 5,654,880 A | 8/1997 | Brkovic et al. | |
| 6,111,494 A | 8/2000 | Fischer | |
| 6,169,391 B1 | 1/2001 | Lei | |
| 6,369,554 B1 * | 4/2002 | Aram | G05F 1/575 323/274 |
| 6,538,906 B1 | 3/2003 | Ke et al. | |
| 7,729,147 B1 | 6/2010 | Wong et al. | |
| 7,746,677 B2 | 6/2010 | Unkrich | |
| 9,287,792 B2 | 3/2016 | Telefus et al. | |
| 9,621,053 B1 | 4/2017 | Telefus | |
| 2003/0151865 A1 * | 8/2003 | Maio | H01L 27/0266 361/52 |
| 2010/0155369 A1 | 6/2010 | Kularatna et al. | |
| 2010/0320840 A1 | 12/2010 | Fridberg | |
| 2011/0292703 A1 | 12/2011 | Cuk | |
| 2013/0119958 A1 * | 5/2013 | Gasperi | H02M 1/10 323/299 |
| 2014/0085940 A1 | 3/2014 | Lee et al. | |
| 2017/0170730 A1 * | 6/2017 | Sugiura | H02M 3/158 |

OTHER PUBLICATIONS

Park, Jeong-Eon, et al, Design on Topologies for High Efficiency Two-Stage AC-DC Converter, 2012 IEEE 7th International Power Electronics and Motion Control Conference—ECCE Asia Jun. 2-5, 2012, Harbin, China, p. 257.

Cuk, Slobodan, 98% Efficient Single-Stage AC/DC Converter Topologies, Power Electronics Europe, Issue 4, 2011, www.power-mag.com; p. 16.

* cited by examiner

HIGH EFFICIENCY AC TO DC CONVERTER AND METHODS

CROSS-REFERENCE TO RELATED APPLICATIONS

This application claims priority to U.S. Provisional application 62/414,467, Titled: High Efficiency AC to DC Converter and Methods, Filed Oct. 28, 2016 and U.S. Provisional Patent Application 62/333,193, Titled: AC Direct power management semiconductor device and power management method, Filed May 7, 2016. Both applications include a common inventor.

STATEMENT REGARDING FEDERALLY SPONSORED RESEARCH OR DEVELOPMENT

Not Applicable.

BACKGROUND OF THE INVENTION

Technical Field

The invention relates to a power management system and methods to provide low voltage DC current from AC mains at very high efficiency.

Related Background Art

The traditional early means for providing DC power from an AC mains was through analog circuitry that included a step-down transformer, a diode rectifier, and a filter comprising an electrolytic capacitor and resistor. The output voltage depended primarily on the turns ratio of the transformer and the circuit was moderately efficient. However, the size and weight of the magnetic structure required to implement the low frequency transformer obviates the use of this approach in miniature equipment.

A later approach that does not use a transformer involves the direct rectification of the AC mains which is directly connected to a voltage regulation circuit comprising an active solid-state device in either a series or shunt connection. The shunt regulator works by providing a current path across the rectified mains output through a variable resistance device, thereby diverting current away from the load. In the simplest implementation of the shunt regulator, a Zener diode is connected in shunt with the load with a resistor in series with this shunt leg. Any rectifier output voltage in excess of the Zener voltage is dropped across the resistor resulting in the excess power being dissipated as heat. Thus, this regulator configuration is very inefficient. Since the Zener current must be larger than the load current to maintain regulation through the Zener effect, the efficiency of this regulator circuit is much smaller than the ratio of the output voltage to the rms value of the rectified supply voltage.

An improved approach uses a series connected solid-state device, such as a bipolar or field-effect transistor, to buffer the Zener voltage reference. The active device is connected in a source-follower or emitter-follower configuration, with the load connected at the source or emitter and the Zener reference connected at the gate or base. The Zener current can be much smaller than in the shunt configuration, so the total current is largely that supplied to the load. Thus, the efficiency of this circuit is generally no better than the ratio of the input to output voltage.

A further improvement to this circuit function is termed a switch mode power supply. There are numerous such designs known in the art, but the commonality is an input rectifier, a switching element that operates at high speeds to switch a storage element, inductor or capacitor, into and out of the supply. If isolation of the input and output is required a high speed transformer is included for isolation and to regulate the output voltage. RC filters are included to reduce ripple in the output. Switch mode power supplies have an advantage of increased efficiency since the power loss mechanisms of the early linear systems are largely eliminated. However, there are transformer losses if isolation is required. Also, the high speed switching is a source of considerable RF noise as well as losses in conductors due to skin effects. Theoretically high efficiencies can and have been obtained in specially designed systems. Efficiencies as high as 95% are reported, but, in reality for low cost isolated systems normal efficiencies are 60 to 70%. A disadvantage of all heretofore known systems is that they cannot be easily integrated. Except for restricted special applications, the designs for present AC to DC converters cannot be integrated on a chip with other system functions. The power dissipated in individual circuit elements is too large for system-on-a-chip levels of integration. Components such as the types of transformers required are simply not available for integration on silicon.

The electronics devices that are ubiquitous typically operate at 3.3 or 5 volts. The requirement to convert 120 or 240 volts AC mains to these low operating voltages taxes the efficiency of the heretofore available power converters. For both linear and switched power supplies the greater the difference between the input and output voltages the greater the inefficiency. There is a need for a high efficiency and low voltage power supply to supply power to the myriads of low power, low voltage consumer devices. Electronics proliferate in "smart" cars and "smart" homes. There is a need for small, efficient power supplies that can support always-on sensors and networks. More and more homes, factories and office buildings, including both new construction and retrofitting, are incorporating electronic sensors to control all uses of power for increased efficiency. There is a need for a low voltage, integrated, high efficiency power supply to support both new construction and retrofitting the power grid existing in homes, factories and office buildings. The power supply must be able to be integrated into the sensor and control electronics to enable such devices to physically fit within the confines of plugs and outlets used to supply local power. There is a need for high efficiency to avoid heat dissipation within the confines of the walls and power grids of homes, offices and factories. There is a need for power converters that have efficiencies in the range of 99 to 100%. There is a need for compact power converters that can fit within a wide range of devices rather than existing as bulky boxes external to the devices. There is a need for power converters that can be integrated.

SUMMARY OF THE INVENTION

An AC to DC power conversion system is described. The system and related devices address the need for a compact, integrated, low cost design, that is highly efficient and provides access to the low voltages used to drive typical silicon based electronic devices used in home sensors and networking, smart cars, etc. In one embodiment, the system includes an efficient electronic switch employed to disconnect the input of a series voltage regulator circuit from a rectified AC mains power supply to reduce the power dissipated within the series regulator. While the switch is closed, energy is accumulated and stored in a shunt energy storage element. The electronic switch is opened when the rectified AC mains waveform exceeds a threshold value. While the switch is open, energy is supplied to the load by the energy storage element through the regulator circuit. In this way the benefits of the regulator circuit accrue to the attached load circuitry while the power dissipated within the regulator circuit is greatly reduced compared to the prior art. A comparator is used to control the electronic switch. In one embodiment the comparator is comprised of an operational amplifier and a reference voltage source. In another embodiment the comparator is comprised of a MOS field effect transistor. In one embodiment the MOS field effect transistor is controlled through a voltage divider. In another embodiment the voltage divider is replaced with a reference voltage source. In other embodiment the reference voltage is adjustable.

The specific examples are not intended to limit the inventive concept to the example application. Other aspects and advantages of the invention will be apparent from the accompanying drawings and detailed description.

DETAILED DESCRIPTION OF THE INVENTION

Figure 1:
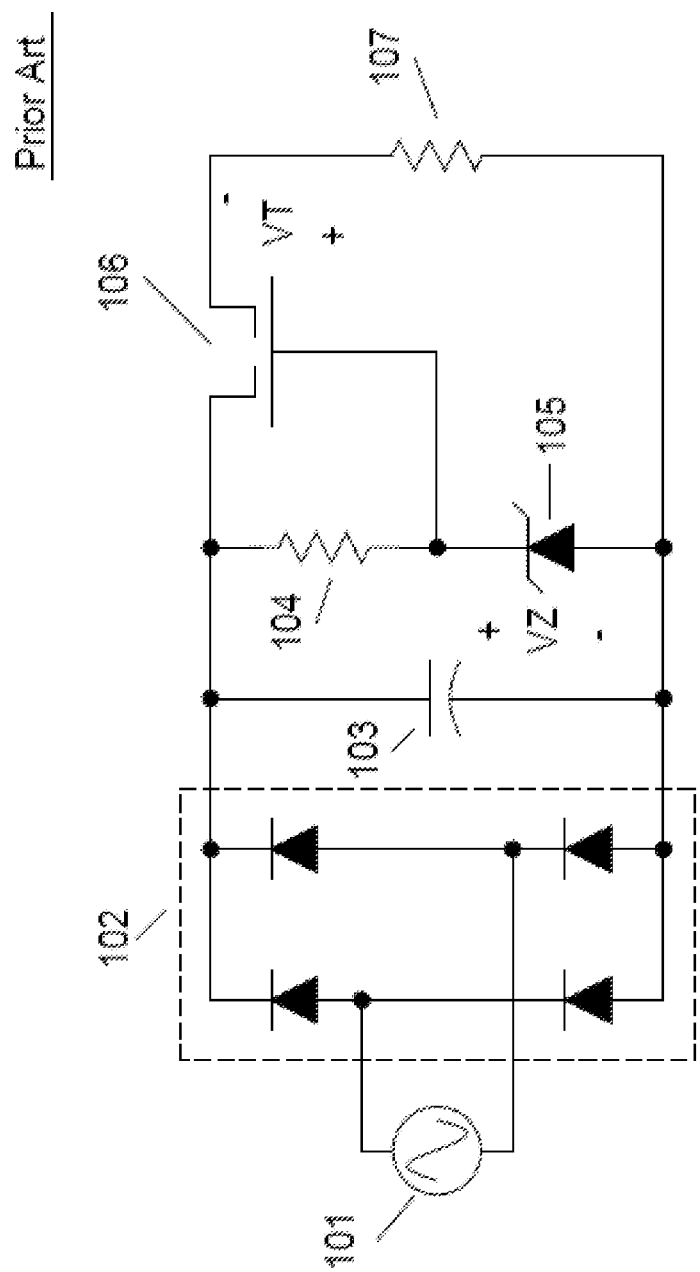
FIG. 1 is a schematic diagram of a prior art AC-DC converter.

FIG. 1 shows a schematic diagram of a prior art AC-DC converter circuit. AC mains 101 are full-wave rectified by diode bridge 102 and the resulting time-varying DC voltage waveform is smoothed by capacitor 103. The smoothed voltage waveform is applied to the input of a series regulator circuit including bias resistor 104, Zener diode 105 having a characteristic Zener voltage $V_Z$, and pass transistor 106, here represented as an enhancement mode MOS field-effect transistor (MOSFET) having a characteristic threshold voltage, $V_T$. The regulator output is applied to the load 107.

In operation, the pass transistor 106 dynamically adjusts its drain-source voltage to keep the load voltage at $V_Z$–$V_T$. In other words, pass transistor 106 forms a source-follower circuit that buffers the Zener voltage, $V_Z$. Since the full load current passes through pass transistor 106, the efficiency of this regulator circuit is simply the ratio of the load voltage to the rms value of the supply voltage. Thus, if the desired load voltage is nominally 3.3V and the supply voltage is 120V rms, then the efficiency is less than 3%. Furthermore, if the load requires only a few tens of milliamperes of current, then pass transistor 106 must continuously dissipate several watts of power as heat. This amount of dissipation typically leads to an unacceptable temperature rise in miniature, enclosed equipment.

Figure 2:
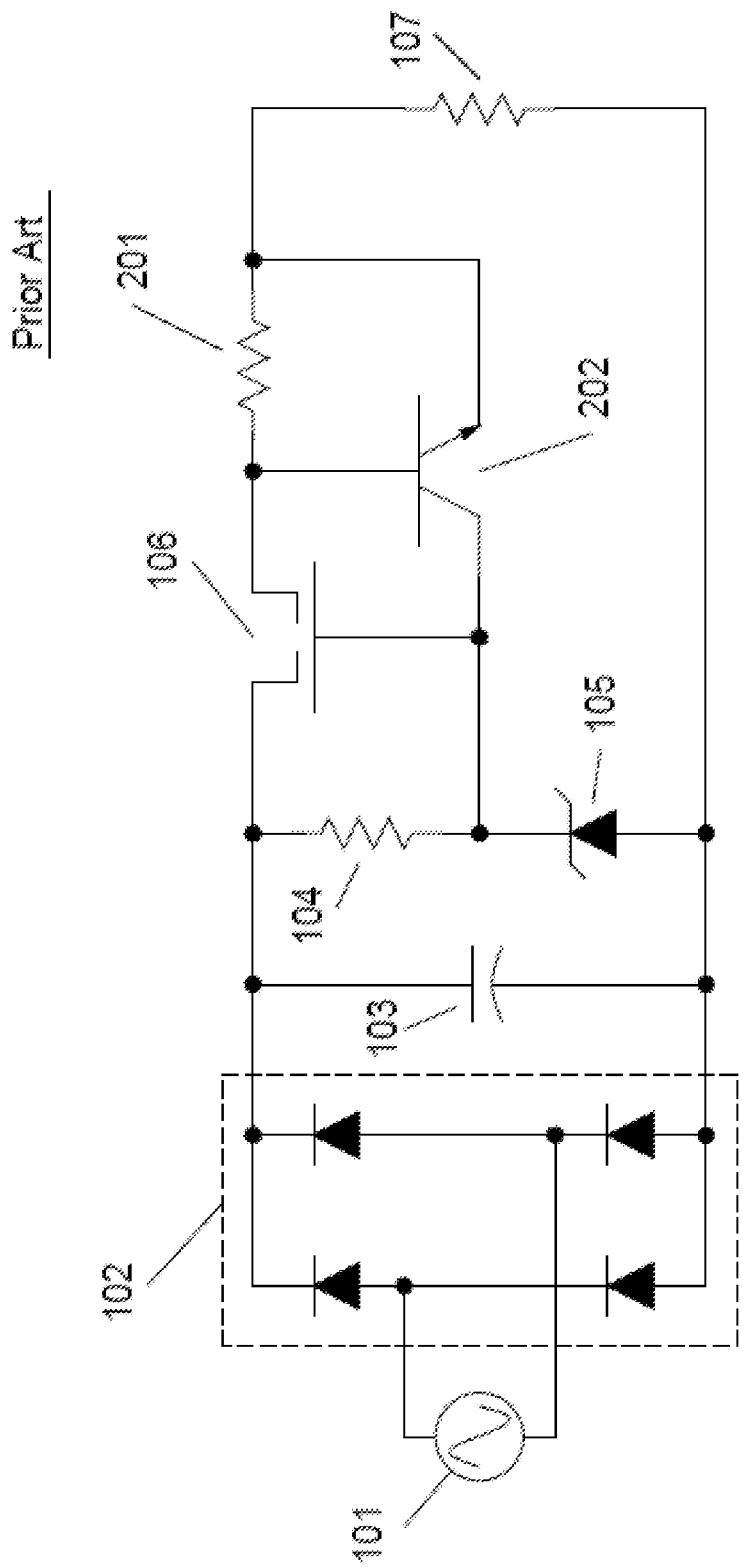
FIG. 2 is a schematic diagram of a prior art AC-DC convertor with current limiting.

A further limitation of the circuit of FIG. 1 is that it provides no protection against output current transients that could damage pass transistor 106. Such transients could occur as a result of accidental shorting of the output terminals during operation or testing, or as a result of capacitive load impedance components. FIG. 2 shows a schematic diagram of a prior art AC-DC converter that includes additional components to limit the output current, thereby protecting the pass transistor. In FIG. 2 a small current sensing resistor 201 is placed in series with the load, and bipolar transistor 202 is connected between the gate of the pass transistor 106 and the load. Now if the voltage drop across resistor 201 exceeds approximately 0.7V (for silicon bipolar transistors) then transistor 202 begins to conduct which reduces the gate-source bias on pass transistor 106, thereby reducing the output current. However, the efficiency of this improved circuit is essentially unchanged compared to that of the circuit shown in FIG. 1.

Figure 3:
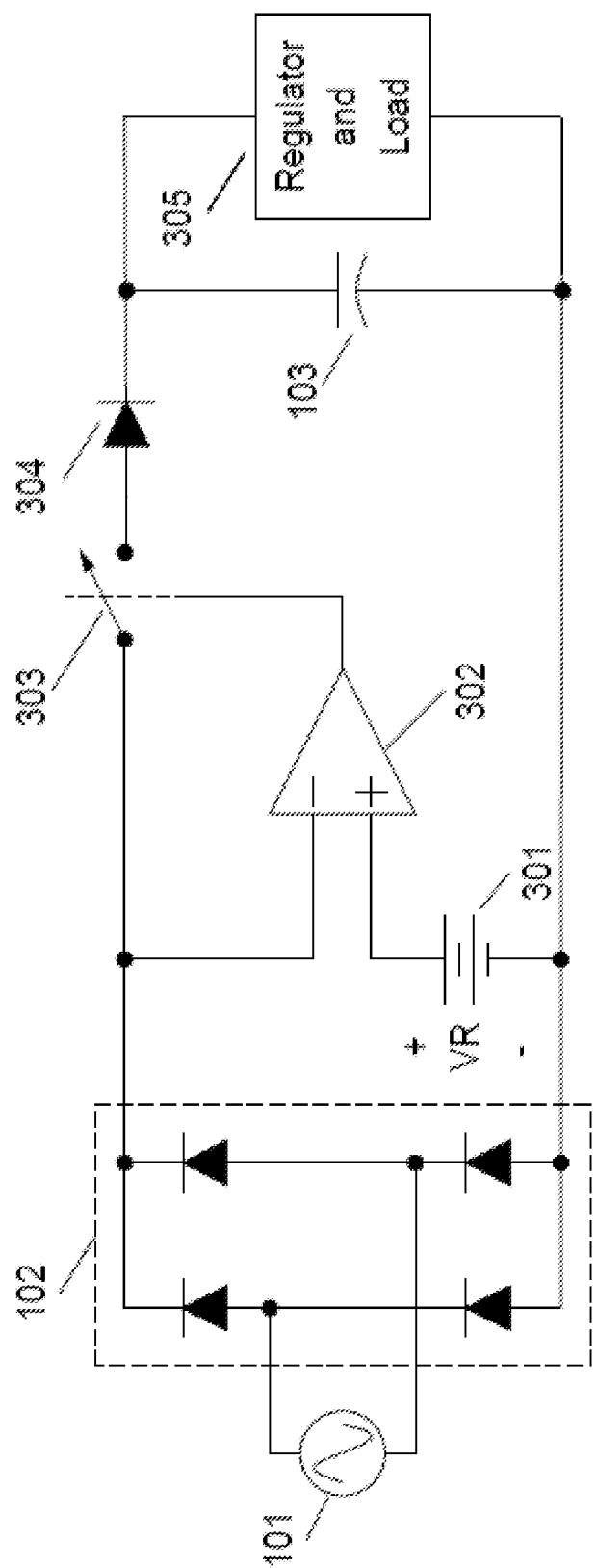
FIG. 3 is a schematic diagram showing the functions in the improved circuit.

In order to improve the efficiency of these prior art series regulator circuits, the power dissipated in the pass transistor must be significantly reduced. In one embodiment of the present invention, the pass transistor is disconnected from the rectified supply voltage when it is not needed. FIG. 3 shows a schematic diagram of an improved rectifier circuit that includes the AC mains 101, the diode bridge 102 and filter capacitor 103, but having additional circuitry inserted between the diode bridge 102 output and the filter capacitor 103. The waveform at the diode bridge 102 output is simply a full-wave rectified sinusoidal waveform that conventionally varies from 0V to approximately 170V peak for a conventional AC mains having an rms value of 120V. Note, however, that the method described below applies to any periodic power waveform assuming that the numeric specifications of the affected components are suitably adjusted. Additionally, the power waveform can include a DC offset if it is smaller than the reference voltage described below.

The additional circuitry includes a comparator circuit 302 having its inverting input connected to the diode bridge 102 output and a voltage reference 301 connected to its non-inverting input, wherein the comparator 302 controls a series switch 303 that disconnects the diode bridge output from succeeding circuitry (opens switch 303) if the diode bridge output voltage exceeds the reference voltage $V_R$. When the reference voltage $V_R$ exceeds the diode bridge output voltage then switch 303 is closed and capacitor 103 is charged through series diode 304. Diode 304 keeps capacitor 103 from discharging back through switch 303 when the diode bridge output voltage decreases. The combination of diode 304 and capacitor 103 form a "peak detector" circuit that stores energy in each one-half of an AC mains cycle to supply to subsequent regulator circuitry and the load 305. The voltage across capacitor 103 need only be large enough to satisfy the energy requirement of the subsequent regulator circuitry and load 305. The input voltage to the series regulator is significantly reduced compared to the rms value of the AC mains. The operation of the "peak detector" circuit ensures the steady-state voltage stored on capacitor 103 is always $V_R$, regardless of fluctuations in the peak voltage of the AC mains, as long as the voltage of the AC mains remains larger than $V_R$. This embodiment of a switching circuit operates as a voltage regulator circuit itself. Since the operation of switch 303 uses negligible energy, the efficiency of the overall improved AC-DC converter circuit shown in FIG. 3 is much larger than seen for the prior art circuits of FIGS. 1 and 2. An additional benefit is a significant reduction in operating temperature rise. Although the comparator 302 is a well-known analog circuit element other analog or digital circuits could be employed to accomplish the desired thresholding function needed to operate switch 303.

In one embodiment the reference voltage VR is fixed. In another embodiment, the reference voltage can be varied. In another embodiment the reference voltage is selectable. In one embodiment the circuit of FIG. 3 is connected to the load and the regulator aspect of the circuit is used to control voltage supplied to the load. In another embodiment an additional regulator is used in series with the circuit of FIG. 3 and the load.

Figure 4:
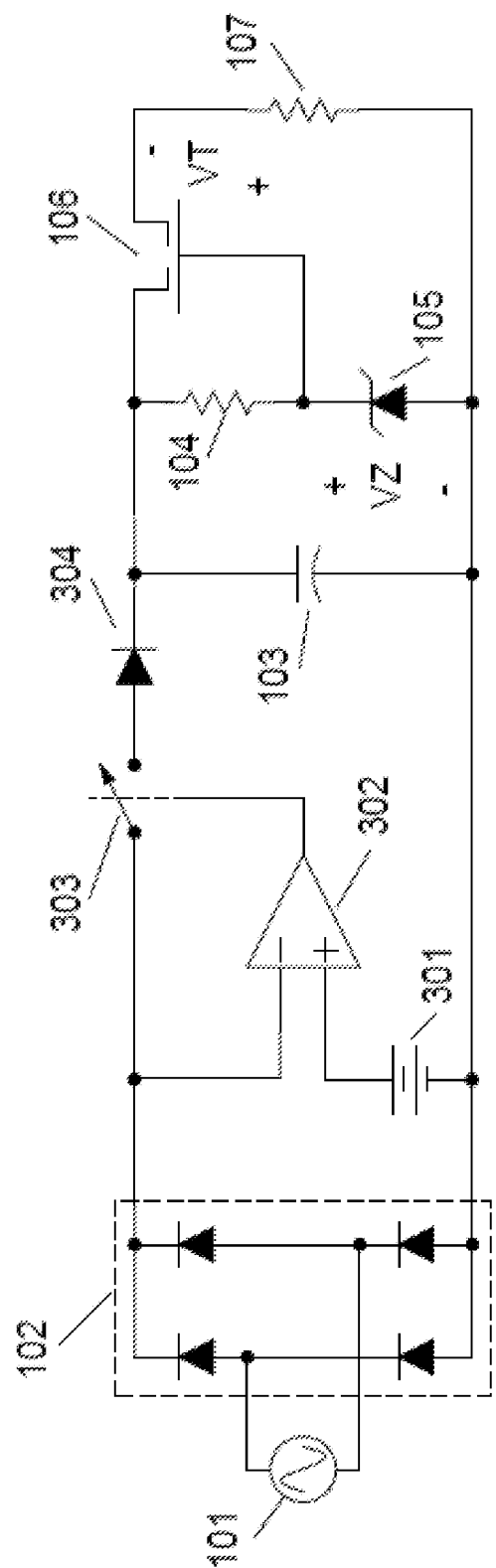
FIG. 4 is a schematic diagram showing the improved AC-DC converter.

FIG. 4 shows a schematic diagram of the improved rectifier circuit interconnected to the series regulator 103-106 from FIG. 1 and provides a convenient basis for establishing the relationships among design variables in the new rectifier circuit. To maintain regulation of the output voltage, the voltage across capacitor 103 must exceed the Zener voltage, $V_Z$. However, capacitor 103 will discharge linearly in time over a half period of the AC mains due to the current provided to the load 107. Thus, capacitor 103 must initially be charged to a peak voltage $V_{peak}=V_Z+I_{load}*t_{MAINS}/(2*C103)$, where $t_{MAINS}$ is the period of the AC mains waveform. This gives the value of capacitor 103 as a function of the difference between $V_{peak}$ and $V_Z$. Higher values of $V_{peak}$ result in higher power dissipation in pass transistor 106, and this can be traded against the maximum practical value of capacitor 103. The efficiency of the regulator is the ratio of the power delivered to the load divided by the total power dissipated in the circuit and is given by $2*(V_Z-V_T)/(V_Z+V_{peak})$.

Figure 5:
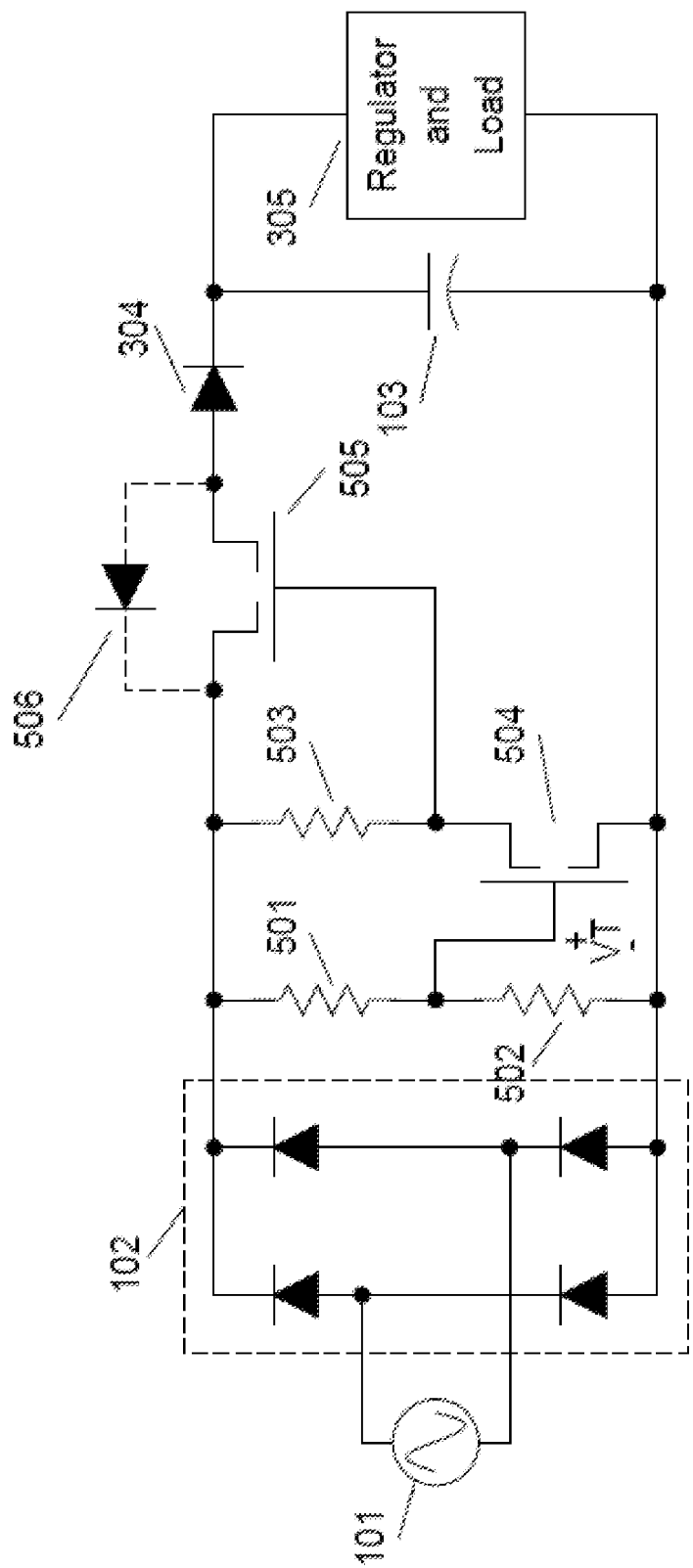
FIG. 5 is a schematic diagram of an embodiment of the improved circuit using MOS field-effect transistors.

FIG. 5 shows a schematic diagram of the improved rectifier circuit wherein the switch 303 is implemented using an enhancement mode MOSFET 505 and the comparator circuit is realized as a single common-source amplifier stage also using an enhancement mode MOSFET 504 characterized by a threshold voltage, $V_T$, and a load resistor 503. Thus, when the output of the voltage divider network comprising resistors 501 and 502 exceeds the threshold voltage of MOSFET 504, $V_T$, the gate of switch 505 is pulled to ground thereby opening switch 505. When the output of the voltage divider network is smaller than $V_T$ the gate of MOSFET 505 is connected to its drain, thereby closing the switch. However, MOSFET 505 is not an ideal switch, and significant power dissipation may be experienced while it is in its conducting state, so that the efficiency of the circuit realized using MOSFETs will not be as great as that obtained in the ideal case shown in FIG. 4. Additionally, as a result of their unique fabrication process, power MOSFETs typically include a parasitic source-to-drain diode 506 that can allow capacitor 103 to discharge when MOSFET 505 is "off" Series diode 304 obviates this spurious discharge path. The existence of the parasitic diode 506 is assumed in subsequent diagrams. Note that it is feasible that, with the possible exception of energy storage capacitor 103, all of the components of FIG. 5 could be fabricated on a single semiconductor chip.

This specific circuit shares the weakness of the simple series regulator circuit of FIG. 1 in that the current through pass transistor 505 is not limited, leading to the potential damage of MOSFET 505 and diode 304 by excessive transient current, particularly during start-up conditions when capacitor 103 may be fully discharged.

Figure 6:
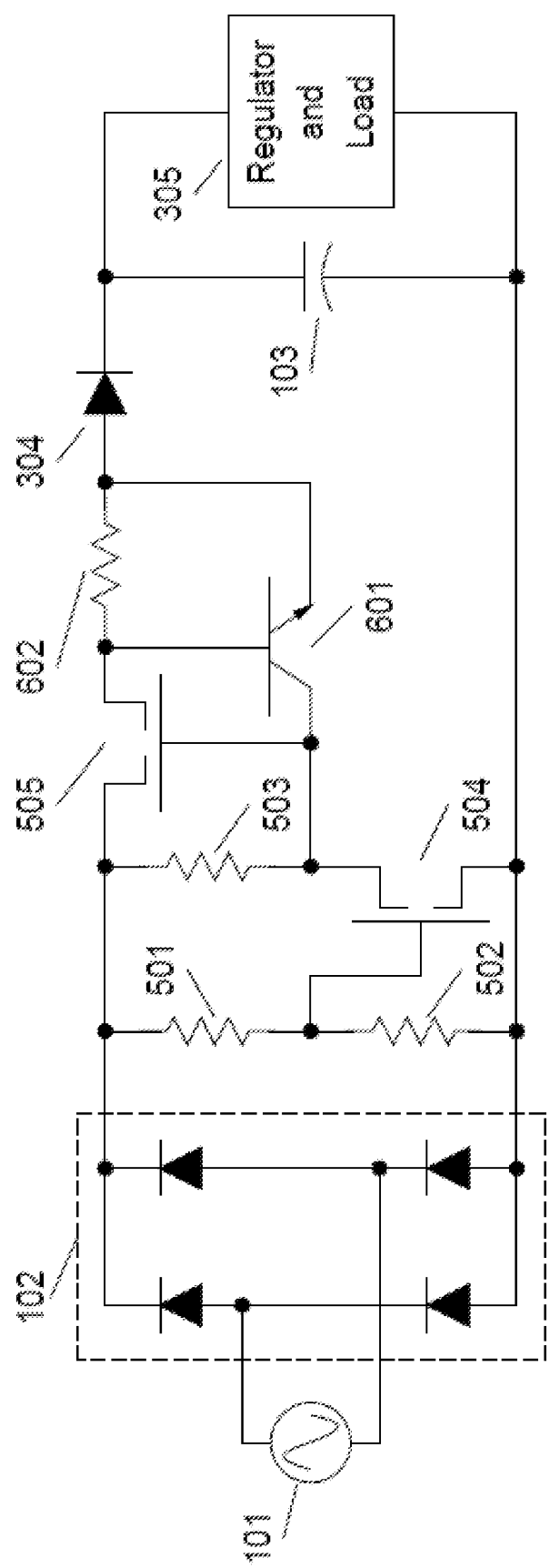
FIG. 6 is a schematic diagram of the embodiment of FIG. 5 including a current limiting function.

FIG. 6 shows a further improved rectifier circuit now including bipolar transistor 601 and current sensing resistor 602 to limit the charging current through MOSFET 505 and diode 304 as previously illustrated in FIG. 2 as an improvement to the prior art series regulator circuit shown in FIG. 1.

Figure 7:
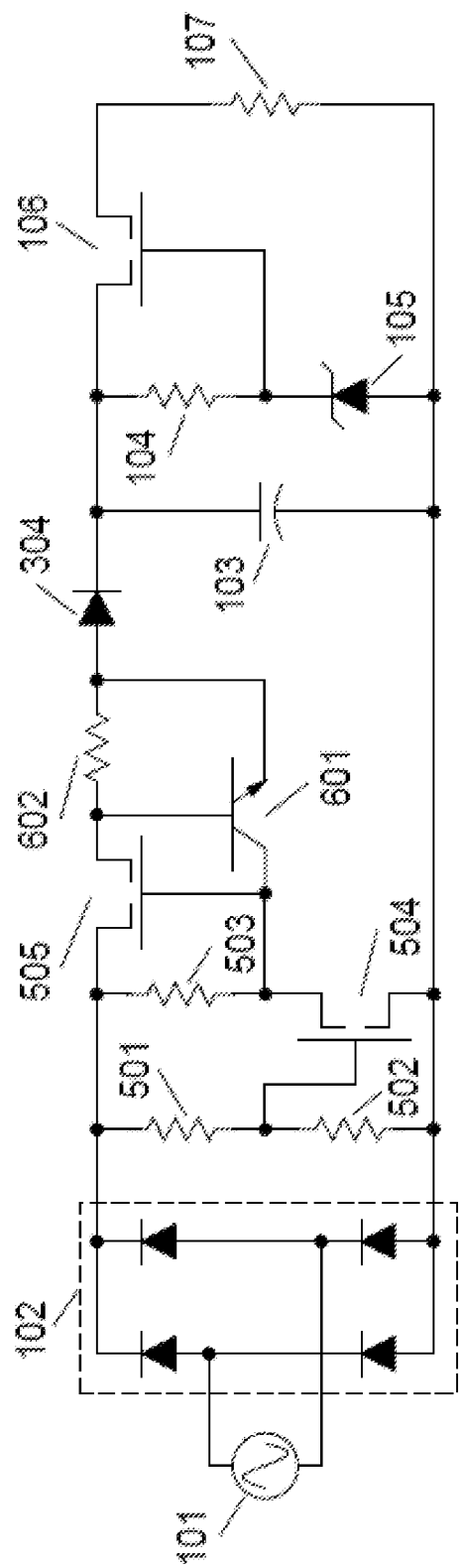
FIG. 7 is a schematic diagram of an embodiment of the improved AC-DC convertor using MOS transistors.

FIG. 7 is a schematic diagram showing the complete high efficiency AC-DC converter with the improved rectifier circuit of FIG. 6 connected to the series regulator 103-106 shown in FIG. 1.

Figure 8:
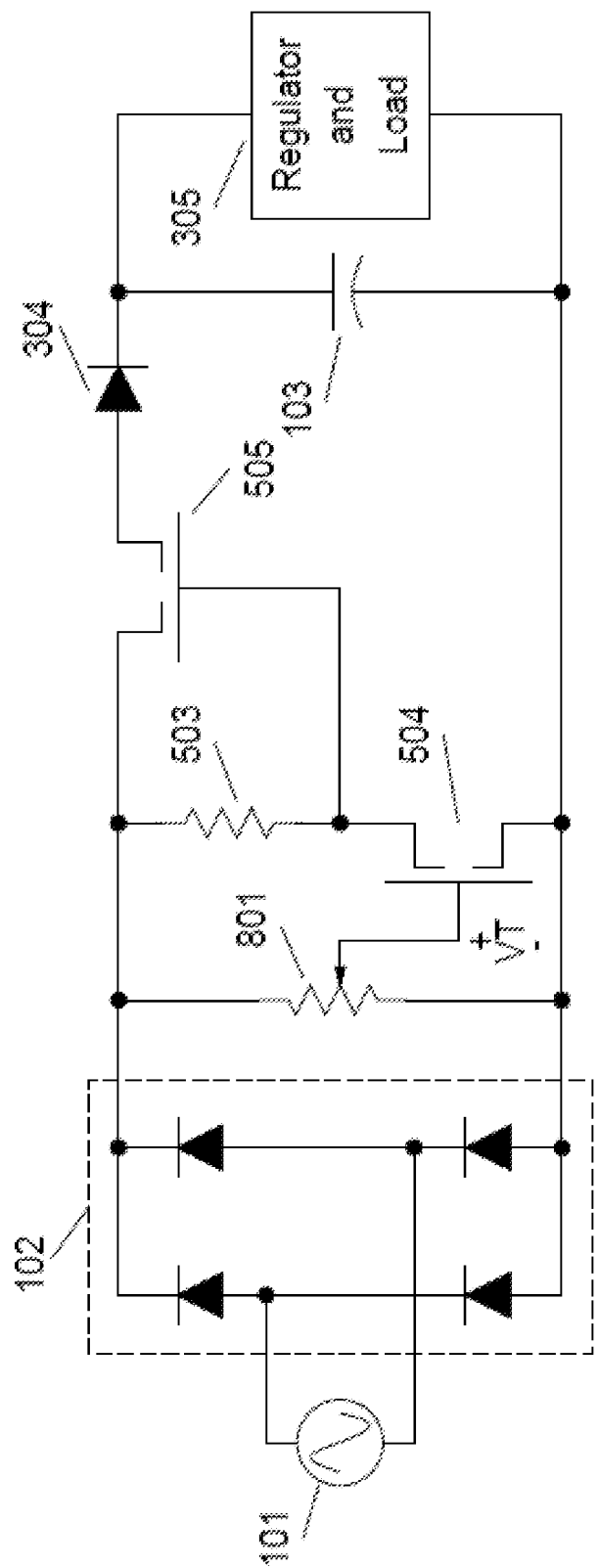
FIG. 8 is a schematic diagram of an embodiment of the improved circuit using MOS field-effect transistors in which the output voltage is manually adjustable.

FIG. 8 is a schematic diagram of an embodiment of the improved circuit using MOSFETs in which the output voltage is manually adjustable. Resistors 501 and 502 in FIG. 5 are replaced with potentiometer 801 which can be manually adjusted to change the voltage waveform applied to the gate of MOSFET 504, thereby changing the voltage stored on capacitor 103.

Figure 9:
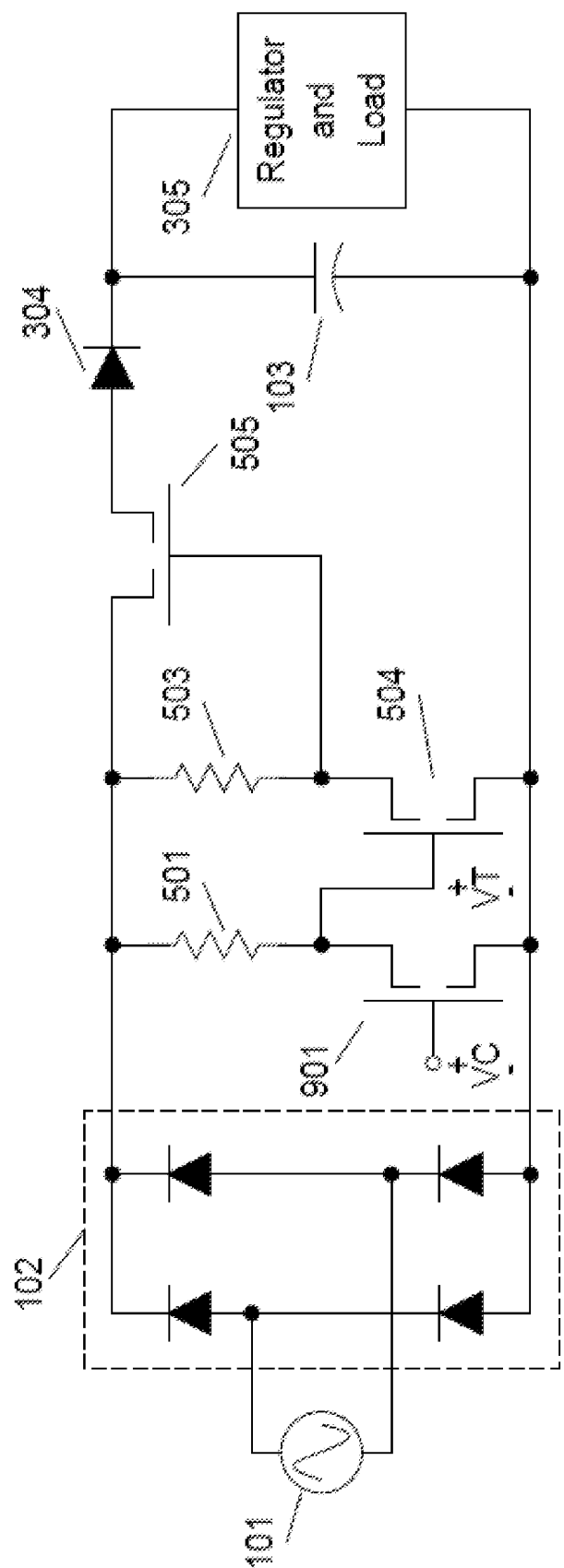
FIG. 9 is a schematic diagram of an embodiment of the improved circuit using MOS field-effect transistors in which the output voltage is electronically adjustable.

FIG. 9 is a schematic diagram of an embodiment of the improved circuit using MOSFETs in which the output voltage is electronically adjustable. Additional MOSFET 901 is connected in place of resistor 502 in FIG. 5 and an external DC control voltage, $V_C$, is applied to the gate of MOSFET 901, thereby changing the voltage applied to the gate of MOSFET 504 and changing the voltage stored on capacitor 103.

Figure 10:
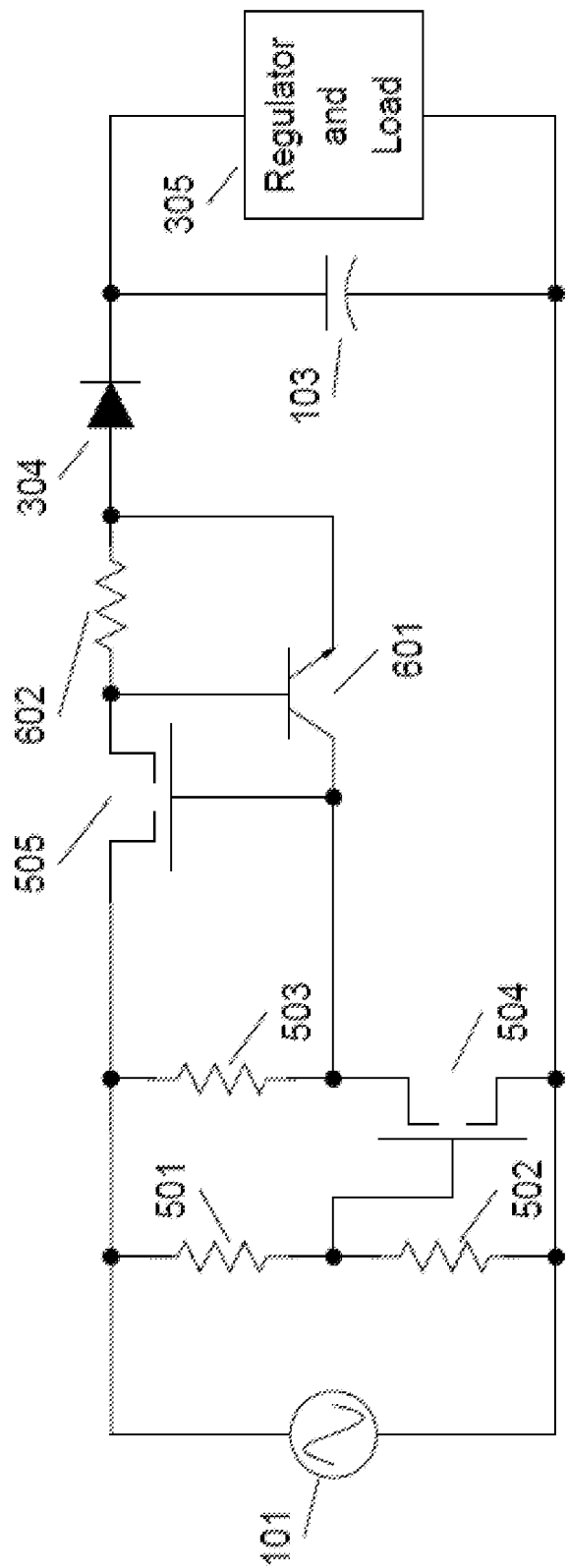
FIG. 10 is a schematic diagram of an embodiment that eliminates the need for a rectifier.

In another embodiment, shown in FIG. 10, the full-wave bridge rectifier 102 is eliminated and the AC mains 101 is connected directly to the voltage divider 501, 502. In another embodiment (not shown) the embodiment shown in FIG. 6 is used without the rectifier 102. Analogously other embodiments include the embodiments described in FIGS. 7-9 except that the rectifier 102 is removed.

Figure 11:
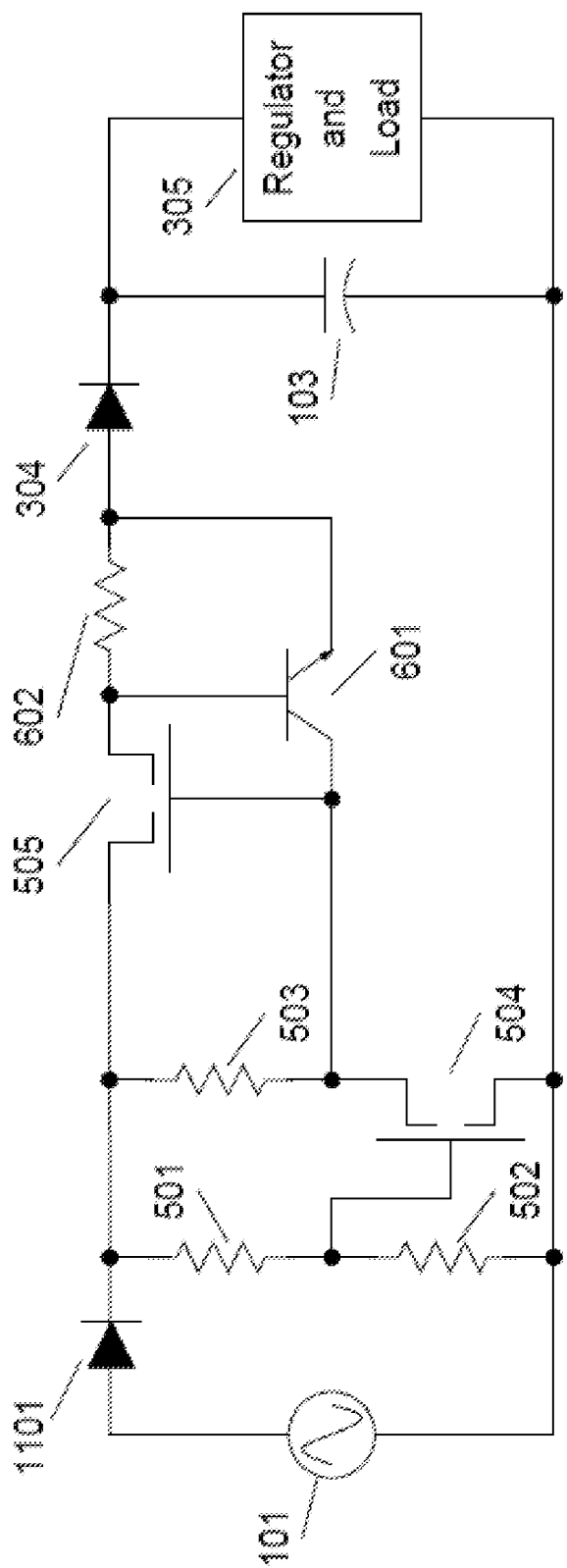
FIG. 11 is a schematic diagram of an embodiment that modifies the embodiment of FIG. 10.

Connecting an AC source 101 directly to the voltage divider may require an unusually robust switch 505 or restrictions on the nature of the AC source. FIG. 11 is a modification of the embodiment shown in FIG. 10 that includes rectifier diode 1101 which acts as a half-wave rectifier and relieves such stringent electrical requirements imposed on switch 505 by the circuit of FIG. 10.

SUMMARY

An improved AC to DC conversion system is described. The system consists of an efficient electronic switch employed to disconnect the input of a prior art series voltage regulator circuit from a rectified AC mains power supply to reduce the power dissipated within the series regulator. While the switch is open the regulator provides power to the load from an energy storage element. In this way the benefits of the regulator circuit accrue to the attached load circuitry while the power dissipated within the regulator circuit is greatly reduced compared to the prior art.

We claim:

1. A system for providing energy as a direct current to an electronic load from a power source having a periodic waveform comprising:
   a) a rectifier circuit, driven by said power source, and, providing a time varying direct current rectified voltage waveform as an output, wherein the rectifier circuit comprises a semiconductor diode array, and, b) an energy storage element, capable of providing energy in the form of a direct current, and, operably connected to said electronic load, and,
c) an electronic switch, having a threshold voltage, interposed between said rectifier circuit and said energy storage element wherein:
  i) said electronic switch is open when said rectified voltage waveform exceeds said threshold voltage value, and
  ii) said electronic switch is closed when said rectified voltage waveform is exceeded by said threshold value, and,
d) the electronic switch comprises a semiconductor switching device controlled by a semiconductor comparator circuit, having one input operably connected to the rectifier output, and, a second input connected to a voltage reference, and, wherein the semiconductor comparator circuit comprises an MOS field-effect transistor, having a characteristic threshold gate-source voltage, and, a load device connected in a common-source amplifier configuration, and, wherein the voltage reference is the threshold gate-source voltage of the MOS field-effect transistor.

2. The system of claim 1 further comprising a voltage regulation circuit interposed between said energy storage element and said electronic load.

3. The system of claim 1 further comprising electronic circuitry, interposed between the electronic switch and the energy storage element, to limit the current flowing through the electronic switch.

4. The system of claim 1 wherein the rectifier circuit is a full-wave diode bridge rectifier.

5. The system of claim 1 wherein the rectifier circuit is a half-wave rectifier circuit.

6. The system of claim 1 wherein the energy storage element comprises a capacitor and a semiconductor diode, and, said diode is interposed between said electronic switch and said capacitor.

7. The system of claim 1 wherein the semiconductor switching device is an MOS field-effect transistor.

8. The system of claim 3 wherein the electronic circuitry to limit the current flowing through the electronic switch, includes a bipolar transistor and a current sense resistor.

9. The system of claim 1 wherein all semiconductor devices are fabricated on a single integrated circuit chip.

10. The system of claim 2 wherein the voltage regulation circuit is a series voltage regulator circuit.

11. A system for providing energy as a direct current to an electronic load from a power source having a periodic waveform comprising:
a) an energy storage element, capable of providing energy in the form of a direct current, and, operably connected to said electronic load, and
b) an electronic switching circuit, interposed between said power source and said energy storage element, wherein said switching circuit comprises:
  i) a voltage divider connected to the alternating current power source;
  ii) a voltage reference, and,
    (1) a comparator circuit having a first input connected to the output of the voltage divider, a second input connected to the voltage reference, and, an output, wherein the comparator circuit is an MOS field-effect transistor having a characteristic threshold gate-source voltage, and, a load device connected in a common-source amplifier configuration, wherein the voltage reference is the threshold gate-source voltage of the MOS field-effect transistor, and,
  iii) an electronic switch device, having a threshold voltage, connected between the alternating current power source and the energy storage element, and, the output of the comparator circuit controls the state of the electronic switch device, and,
    (1) said electronic switch device is open when said output of the voltage divider exceeds said threshold voltage value, and,
    (2) said electronic switch device is closed when said output of the voltage divider is exceeded by said threshold value.

12. The system of claim 11 further comprising a voltage regulation circuit interposed between said energy storage element and said electronic load.

13. The system of claim 11 further comprising electronic circuitry interposed between the electronic switch and the energy storage element to limit the current flowing through the electronic switch.

14. The system of claim 11 wherein the energy storage element comprises a capacitor and a semiconductor diode and said diode is interposed between said electronic switch and said capacitor.

15. The system of claim 11 wherein the voltage divider is manually adjustable.

16. The system of claim 11 wherein the voltage divider is electronically adjustable.

17. The system of claim 11 wherein the electronic switch is an MOS field-effect transistor.

18. The system of claim 13 wherein the electronic circuitry to limit the current flowing through the electronic switch, includes a bipolar transistor and a current sense resistor.

19. The system of claim 12 wherein the voltage regulation circuit is a series voltage regulator circuit.

20. The system of claim 12 wherein the voltage regulation circuit is a shunt voltage regulator circuit.

21. A system for providing energy as a direct current to an electronic load from a power source having a periodic waveform comprising:
a) a rectifier circuit driven by said power source and providing a time varying direct current rectified voltage waveform as an output, wherein the rectifier circuit comprises a semiconductor diode array, and,
b) an energy storage element capable of providing energy in the form of a direct current and operably connected to said electronic load, and,
c) an electronic switch having a threshold voltage interposed between said rectifier circuit and said energy storage element wherein:
  i) said electronic switch is open when said rectified voltage waveform exceeds said threshold voltage value, and
  ii) said electronic switch is closed when said rectified voltage waveform is exceeded by said threshold value, and,
d) the electronic switch comprises a semiconductor switching device controlled by a semiconductor comparator circuit having one input operably connected to the rectifier output and a second input connected to a voltage reference, and, wherein the semiconductor comparator circuit comprises a bipolar transistor having a characteristic base-emitter turn-on voltage and a load device connected in a common-emitter amplifier configuration and wherein the voltage reference is the base-emitter turn-on voltage of the bipolar transistor.

22. The system of claim 21 further comprising a voltage regulation circuit interposed between said energy storage element and said electronic load.

23. The system of claim 21 further comprising electronic circuitry interposed between the electronic switch and the energy storage element to limit the current flowing through the electronic switch.

24. The system of claim 21 wherein the rectifier circuit is a full-wave diode bridge rectifier.

25. The system of claim 21 wherein the rectifier circuit is a half-wave rectifier circuit.

26. The system of claim 21 wherein the energy storage element comprises a capacitor and a semiconductor diode and said diode is interposed between said electronic switch and said capacitor.

27. The system of claim 21 wherein the semiconductor switching device is an MOS field-effect transistor.

28. The system of claim 23 wherein the electronic circuitry interposed between the electronic switch and the energy storage element to limit the current flowing through the electronic switch includes a bipolar transistor and a current sense resistor.

29. The system of claim 21 wherein all semiconductor devices are fabricated on a single integrated circuit chip.

30. The system of claim 22 wherein the voltage regulation circuit is a series voltage regulator circuit.

31. The system of claim 22 wherein the voltage regulation circuit is a shunt voltage regulator circuit.

32. A system for providing energy as a direct current to an electronic load from a power source having a periodic waveform comprising:
   a) an energy storage element capable of providing energy in the form of a direct current and operably connected to said electronic load, and
   b) an electronic switching circuit interposed between said power source and said energy storage element, wherein said switching circuit comprises:
      i) a voltage divider connected to the alternating current power source;
      ii) a voltage reference, and,
      iii) a comparator circuit having a first input connected to the output of the voltage divider, a second input connected to the voltage reference, and an output, wherein the comparator circuit is a bipolar transistor having a characteristic base-emitter turn-on voltage and a load device connected in a common-emitter amplifier configuration wherein the voltage reference is the base-emitter turn-on voltage of the bipolar transistor, and,
      iv) an electronic switch device, having a threshold voltage, connected between the alternating current power source and the energy storage element and, the output of the comparator circuit controls the state of the electronic switch device, and
         (1) said electronic switch device is open when said output of the voltage divider exceeds said threshold voltage value, and
         (2) said electronic switch device is closed when said output of the voltage divider is exceeded by said threshold value.

33. The system of claim 32 further comprising a voltage regulation circuit interposed between said energy storage element and said electronic load.

34. The system of claim 32 further comprising electronic circuitry interposed between the electronic switch and the energy storage element to limit the current flowing through the electronic switch.

35. The system of claim 32 wherein the energy storage element comprises a capacitor and a semiconductor diode and said diode is interposed between said electronic switch and said capacitor.

36. The system of claim 32 wherein the voltage divider is manually adjustable.

37. The system of claim 32 wherein the voltage divider is electronically adjustable.

38. The system of claim 32 wherein the electronic switch is an MOS field-effect transistor.

39. The system of claim 32 wherein the electronic switch is a bipolar transistor.

40. The system of claim 33 wherein the voltage regulation circuit is a series voltage regulator circuit.

41. The system of claim 33 wherein the voltage regulation circuit is a shunt voltage regulator circuit.

* * * * *